(12) United States Patent
Maruyama et al.

(10) Patent No.: US 8,279,509 B2
(45) Date of Patent: Oct. 2, 2012

(54) MEMS-SCANNING MIRROR DEVICE AND METHOD FOR MANUFACTURING THE SAME

(75) Inventors: Hirotake Maruyama, Itabashi-ku (JP); Makoto Fujino, Itabashi-ku (JP); Hirokazu Tamura, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 440 days.

(21) Appl. No.: 12/588,804

(22) Filed: Oct. 28, 2009

(65) Prior Publication Data

US 2010/0103492 A1    Apr. 29, 2010

(30) Foreign Application Priority Data

Oct. 29, 2008 (JP) ................................. 2008-277897

(51) Int. Cl.
*G02B 26/08* (2006.01)
(52) U.S. Cl. .................... 359/200.6; 359/199.2; 359/900
(58) Field of Classification Search ............... 359/199.2, 359/200.6, 900
See application file for complete search history.

(56) References Cited

U.S. PATENT DOCUMENTS

| | | | |
|---|---|---|---|
| 6,641,273 B1 | 11/2003 | Staker et al. | |
| 6,758,983 B2 | 7/2004 | Conant et al. | |
| 6,914,710 B1 | 7/2005 | Novotny et al. | |
| 7,508,111 B2 | 3/2009 | Ko et al. | |
| 2009/0244668 A1* | 10/2009 | Fujino et al. | 359/200.6 |
| 2009/0303563 A1* | 12/2009 | Drabe et al. | 359/214.1 |

FOREIGN PATENT DOCUMENTS

| | | |
|---|---|---|
| JP | 2004-119933 | 4/2004 |
| JP | 2006-116696 | 5/2006 |
| JP | 2008-65293 | 3/2008 |

OTHER PUBLICATIONS

Japanese Office Action mailed Jul. 17, 2012 in corresponding Japanese Patent Application No. 2008-277897.

* cited by examiner

*Primary Examiner* — James Phan
(74) *Attorney, Agent, or Firm* — Wenderoth, Lind & Ponack, L.L.P.

(57) ABSTRACT

An MEMS-scanning mirror device includes an electrostatic comb actuator, in which a mirror surface is formed below a top surface (TOPS) of the mirror device. In a method for manufacturing the MEMS-scanning mirror device having the electrostatic comb actuator, a mirror surface (10BS) of a mirror plate (10B) is formed by removing an insulating layer (I) thereon.

4 Claims, 6 Drawing Sheets

MEMS-SCANNING MIRROR DEVICE AND METHOD FOR MANUFACTURING THE SAME

CROSS-REFERENCE TO THE RELATED APPLICATION

This application is based on and claims the priority benefit of Japanese Patent Application No. 2008-277897, filed on Oct. 29, 2008, the disclosure of which is incorporated herein by reference in its entirety.

BACKGROUND OF THE INVENTION

1. Field of the Invention

The present invention relates to an MEMS (micro electromechanical system)-scanning mirror device and a method for manufacturing the mirror device.

2. Description of the Related Art

Along with the recent improvement in the multifunctionality and operation speed of optical devices, high-speed optical path switching and vector drawing of desired patterns have been required. For example, in an electronic distance meter, in order to compensate for measurement errors, alternate switching is performed between an external optical path for measuring a distance from the electronic distance meter to an external target and an internal optical path provided inside the device.

For example, a variable optical attenuator in a distance measuring equipment disclosed in Japanese Patent Application Publication No. 2008-65293 requires optical path switching for attenuation. Moreover, in capturing a target by the electronic distance meter, a light beam has to be projected at a specified angle. Furthermore, in order to draw a desired pattern, a line drawing display device using laser beam scanning is required to be able to perform optical scanning corresponding to the pattern.

In either case, it is important to improve the operation speed and power consumption. For that purpose, application of an MEMS-scanning mirror to changing a light reflection direction and scanning has been examined. Moreover, in addition to the improvement in the operation speed of an actuator and the power consumption thereof, improvement in the specularity of a mirror portion configured to reflect light and in manufacturing yield has been the primary focus in this development field. Here, the specularity corresponds to the roughness of a surface of the mirror portion, and a smooth surface having small surface roughness is said to have high specularity.

FIG. 6 is a schematic view showing a conventional example of an MEMS-scanning mirror 27 having stepped electrostatic comb actuators. As shown in FIG. 6, certain steps are provided between movable combteeth 27e and fixed combteeth 27fA and 27fB.

The MEMS-scanning mirror 27 having the stepped electrostatic comb actuators includes a disc-shaped mirror plate 27a. In the mirror plate 27a, a pair of radially-extended shaft portions 27b are formed. The pair of shaft portions 27b are connected to fixed portions 27d through spring portions 27c, respectively.

The movable combteeth 27e are formed in a middle of each of the shaft portions 27b. The fixed combteeth 27fA and 27fB are allowed to face the movable combteeth 27e. The movable combteeth 27e and the fixed combteeth 27fA and 27fB form a pair of left and right electrostatic actuators.

The pairs of left and right electrostatic actuators are used to drive and rotate the mirror plate 27a. Specifically, the mirror plate 27a is driven to be rotated in an arrow F direction by applying a voltage to the pairs of left and right fixed combteeth 27fA and 27fB. Note that there are two kinds of drive systems: DC drive for performing rotation from a first angle to a second angle by applying a DC voltage between the movable combteeth and one of or both of the left and right fixed combteeth and resonant drive for performing rotation based on resonance by applying a periodic voltage such for example as an AC voltage.

There have been known various methods for manufacturing of the MEMS-scanning mirror having the stepped electrostatic comb actuators. For example, U.S. Pat. No. 6,758,983 discloses a process for manufacturing an MEMS-scanning mirror which includes two layers of silicon wafers and can be driven to be rotated around one axis. The process includes the steps of (a) forming fixed combteeth structures in a surface of a first silicon wafer;

(b) bonding a second silicon wafer to the surface of the first silicon wafer where the fixed combteeth structures are formed;

(c) after the step (b), reducing a thickness of the second silicon wafer to a predetermined thickness and then performing grinding or polishing to obtain specularity;

(d) after the step (c), removing a portion corresponding to a lower portion of a mirror plate from a surface of the first silicon wafer, the surface being opposite to the surface where the fixed combteeth structures are formed;

(e) after the step (d), forming movable combteeth and the mirror plate in the second silicon wafer; and (f) after the step (e), removing an oxide layer between the first and second silicon wafers to obtain an MEMS-scanning mirror having stepped electrostatic comb actuators. Note that the mirror plate may be coated with gold, aluminum or the like by deposition or the like in order to improve its optical characteristics.

In addition, U.S. Pat. No. 6,914,710 discloses a process for manufacturing an MEMS-scanning mirror which can be driven to be rotated around two axes. The process includes the steps of:

(a) forming a lower layer structure of the MEMS-scanning mirror having fixed combteeth, in a device layer in a silicon-on-insulator (SOI) wafer;

(b) forming a concave portion in another silicon wafer;

(c) after the step (b), bonding the device layer of the SOI wafer to the silicon wafer in a state where the lower layer structure and the concave portion face each other;

(d) after the step (c), reducing a thickness of a handle layer of the SOI wafer to a predetermined thickness and then performing mirror finishing;

(e) after the step (d), forming an upper layer structure of the MEMS-scanning mirror having movable combteeth and a mirror plate, in the handle layer; and (f) after the step (e), removing an exposed silicon oxide layer to obtain stepped electrostatic comb actuators.

Note that the mirror is completed by forming a film of gold with chromium as an underlayer, on the mirror plate formed in the step (e).

Moreover, there has also been known a technology related to an MEMS structure described in U.S. Pat. No. 6,641,273, for example.

However, in each of the conventional MEMS-scanning mirrors having the stepped electrostatic comb actuators described in U.S. Pat. Nos. 6,758,983 and 6,914,710, for example, the mirror plate is formed on a top surface of the device. Thus, the mirror has the following problems, which lead to a situation where it is difficult to obtain a mirror having high specularity and to improve manufacturing yield.

Specifically, in formation of the mirror plate, processing such as grinding, lapping and polishing has heretofore been performed on the uppermost layer of the device in order to improve the specularity. In this event, as in the case of the manufacturing method disclosed in U.S. Pat. No. 6,914,710, for example, when structures such as combteeth and hollows are previously formed in a lower portion of the silicon wafer to be subjected to such processing, especially when a hollow is formed below the mirror plate, it is difficult to secure uniformity of the processing. As a result, scratches are left on the mirror surface, which makes it difficult to obtain high specularity with good yield.

Furthermore, in conventional cases, since the mirror portion is formed on the top surface of the device, damage to the mirror portion due to handling, internal stress and the like, scratches on the mirror surface, and the like are likely to occur in a processing step subsequent to processing steps of mask formation, etching, mask removal, film formation and the like after formation of the mirror portion. These are also obstacles to achievement of good specularity and high manufacturing yield.

Such problems are significant in a subsequent processing step particularly when a hollow is formed below the mirror plate portion.

Moreover, a concrete manufacturing method is not disclosed in U.S. Pat. No. 6,641,273, for example. Therefore, it is impossible to achieve a high manufacturing yield according to a manufacturing method including: exposing the surface of the mirror by removing silicon oxide films covering the entire front and back surfaces thereof; forming stepped combteeth structures with a handle layer present below the mirror plate; or exposing the surface of the mirror plate by removing silicon oxide films after forming the stepped combteeth structures with the handle layer is present below the mirror plate.

SUMMARY OF THE INVENTION

A first object of the present invention is to provide an MEMS-scanning mirror device including a mirror surface having excellent specularity.

A second object of the present invention is to provide a method for manufacturing the MEMS-scanning mirror device with efficient manufacturing yield.

To achieve the first object above, an MEMS-scanning mirror device according to an embodiment of the present invention includes an electrostatic comb actuator and a mirror portion driven by the electrostatic comb actuator. In the device, a mirror surface of the mirror portion is positioned below a surface of the electrostatic comb actuator.

To achieve the second object above, a method for manufacturing an MEMS-scanning mirror device according to an embodiment of the present invention includes the steps of: preparing a wafer in which a handle layer and a device layer having a mirror-finished surface are bonded to each other with a silicon oxide film interposed therebetween, the handle layer being a layer in which a hollow is to be formed; forming, in the device layer, a lower layer structure to be formed in the device layer, the structure corresponding to a lower layer component of the MEMS-scanning mirror; bonding a wafer for forming an upper device layer to the device layer of the wafer after formation of the lower layer structure, with a silicon oxide film interposed therebetween forming the upper device layer having a predetermined thickness by processing the upper wafer; forming, in the upper device layer, an upper layer structure to be formed in the upper device layer, the structure corresponding to an upper layer component of the MEMS-scanning mirror; forming the hollow in the handle layer; and completing the MEMS-scanning mirror by removing the silicon oxide films on the lower layer structure.

BRIEF DESCRIPTION OF THE DRAWINGS

FIG. 1A is a plan view, FIG. 1B is a cross-sectional view taken along the line A-A' in FIG. 1A, and FIG. 1C is a cross-sectional view taken along the line B-B' in FIG. 1A.

FIG. 2A is a plan view, FIG. 2B is a cross-sectional view taken along the line B-B' in FIG. 2A, and FIG. 2C is a cross-sectional view taken along the line A-A' in FIG. 2A.

FIG. 3A is a plan view, FIG. 3B is a cross-sectional view taken along the line B-B' in FIG. 3A, and FIG. 3C is a cross-sectional view taken along the line A-A' in FIG. 3A.

FIG. 4A is an explanatory view of a preparation step, FIG. 4B is an explanatory view of a step of forming structures in a device layer, FIG. 4C is an explanatory view of a silicon wafer bonding step, FIG. 4D is an explanatory view of a step of forming an uppermost device layer, and FIG. 4E is an explanatory view of a step of forming a mask on a handle layer.

FIG. 5A is an explanatory view of a step of forming structures in the uppermost device layer, FIG. 5B is an explanatory view of a step of forming hollows in the handle layer, FIG. 5C is an explanatory view of a step of removing a silicon oxide film, and FIG. 5D is an explanatory view of a step of forming films on the respective device layers.

DETAILED DESCRIPTION OF THE PREFERRED EMBODIMENTS

With reference to the accompanying drawings, preferred embodiments of the present invention will be described in detail below.

First Embodiment

Figure 1A:
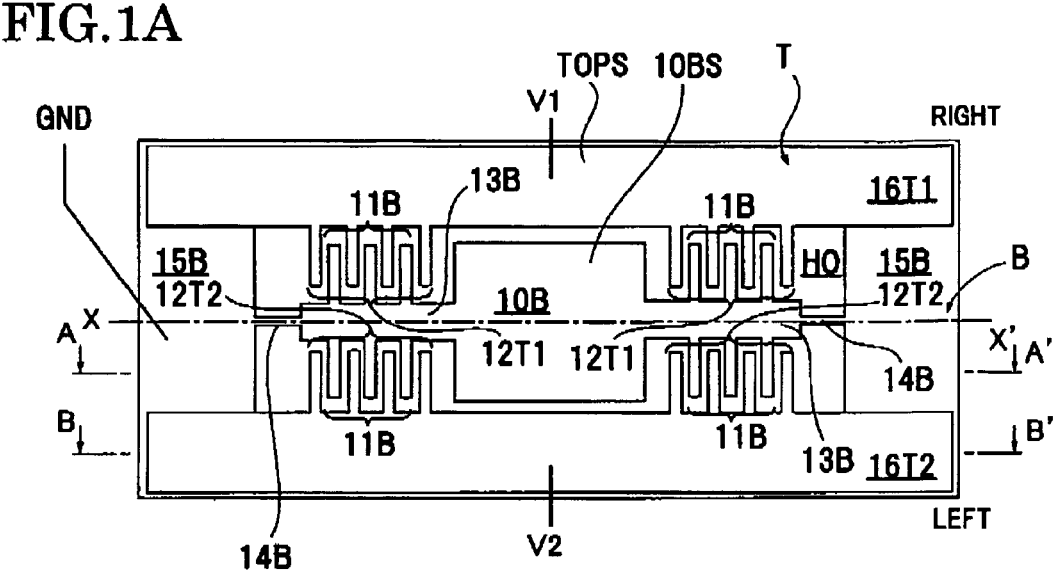
FIG. 1A to 1C are explanatory views showing a first embodiment of an MEMS-scanning mirror according to the present invention.
Figure 1B:
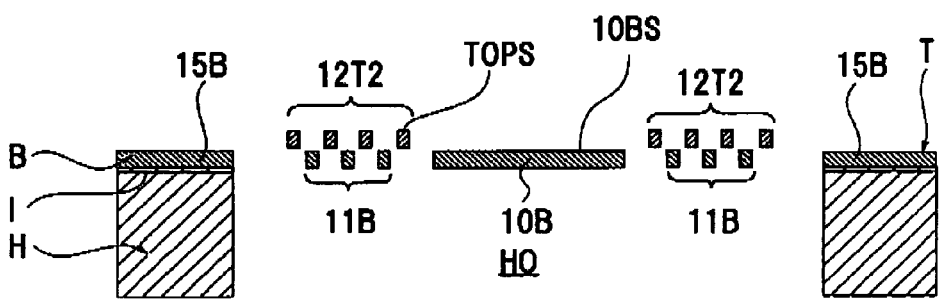
Figure 1C:
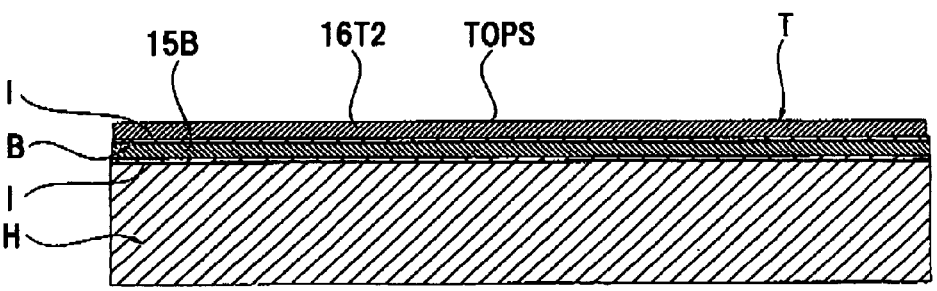

FIGS. 1A to 1C show an MEMS-scanning mirror device having electrostatic comb actuators according to a first embodiment of the present invention. The MEMS-scanning mirror device may be configured to include, for example, at least one stepped electrostatic comb actuator. In the illustrated embodiment, as shown in FIGS. 1A to 1C, the MEMS-scanning mirror device includes the electrostatic comb actuators and a mirror portion or mirror plate 10B driven by the electrostatic comb actuators. The MEMS-scanning mirror device has, for example, a three-layer structure including an uppermost device layer T, a lowermost handle layer H and a device layer B therebetween.

The device layer T and the device layer B are made of n type or p type doped conductive silicon. For the handle layer H, insulating or conductive silicon or glass is used. The device layer T, the device layer B and the handle layer H are electrically insulated from each other by insulating layers I (see FIG. 1C). The insulating layers I are preferably a silicon oxide when the handle layer H is made of silicon.

In the handle layer H, a hollow HO is formed (see FIG. 1B). Components of the electrostatic comb actuators, which are formed in the device layers T and B, respectively, are located above the hollow HO. The components of the electrostatic comb actuators, which are formed in the device layers T and B, will be described while attaching subscripts to the symbols T and B denoting the respective layers.

The components of the electrostatic comb actuators formed in the device layer B include the mirror plate 10B, movable combteeth 11B, shafts 13B, springs 14B and frames 15B. All these components are integrated together and electrically equipotential.

In the mirror plate 10B, a pair of the shafts 13B extended in one direction are formed. The pair of shafts 13B are connected to the frames 15B through the springs 14B, respectively. In a middle of each of the shafts 13B, one or more movable combteeth 11B are formed. Note that a film made of gold, aluminum or the like may be formed on a surface of the mirror plate 10B.

In the device layer T, one or more fixed combteeth corresponding to the movable combteeth 11B are formed. In the embodiment shown in FIGS. 1A to 1C, the fixed combteeth include right fixed combteeth 12T1, left fixed combteeth 12T2, a right base 16T1 and a left base 16T2. The right fixed combteeth 12T1 and the left fixed combteeth 12T2 are integrally formed with the right base 16T1 and the left base 16T2, respectively, and have electrically the same potentials as those of the bases. The potentials of the right base 16T1 and the left base 16T2 can be set independently of each other.

For the device layer B, a silicon wafer having a fine mirror surface can be used. A material obtained by bonding the device layer B and the handle layer H with the insulating layer I interposed therebetween can be provided for formation of the MEMS-scanning mirror. Alternatively, an SOI wafer may also be used, in which the device layer B, the insulating layer I, and the handle layer H are previously integrated together. A surface of the device layer B in the SOI wafer can be finished in a fine mirror surface state.

In manufacturing of the MEMS-scanning mirror by using any of the materials described above, the mirror plate 10B having good specularity can be achieved by using the fine mirror surface of the device layer B as it is.

In the MEMS-scanning mirror device, as shown in FIGS. 1A and 1B, a surface 10BS of the mirror plate 10B is located below a top surface TOPS that is a surface of the device layer T for the electrostatic comb actuators. This structure is obtained because the top surface of each electrostatic comb actuator is formed of the surface of the device layer T positioned at the uppermost layer and because the surface of the mirror portion is formed of the surface of the device layer B located below the device layer T. Therefore, a step is formed between the top surface of each comb actuator and the surface of the mirror portion. This also means that, basically, at least one step is formed between an upper surface of at least one movable combtooth and a surface of at least one fixed combtooth. In the embodiment shown in FIGS. 1A to 1C, steps are formed between the upper surfaces of the multiple movable combteeth and the surfaces of the multiple fixed combteeth. Such a structure is formed by use of a manufacturing method to be described later.

In a case of a conventional MEMS-scanning mirror having electrostatic comb actuators, a mirror is formed on a top surface and, after formation of a mirror plate, subsequent processing is performed while exposing a surface of the mirror plate to the outside. On the other hand, in a case of the MEMS-scanning mirror device according to the present invention, the surface 10BS of the device layer B can be protected by the insulating layer I such as a silicon oxide film until immediately before completion of the device. Thus, in steps of mask formation, etching, mask removal, film formation and the like to be described later, the surface 10BS of the mirror plate 10B can be prevented from being scratched during handling or the like and from being contaminated.

The movable combteeth 11B are inserted between the right fixed combteeth 12T1 and between the left fixed combteeth 12T2. When a voltage is applied between the movable combteeth 11B and the fixed combteeth 12T1 and 12T2, a torque around an X-X' axis is generated in the movable combteeth 11B, that is to say, the mirror plate 10B so as to lower electrostatic energy.

A method for driving the MEMS-scanning mirror device according to the present invention is the same as the method for driving the conventional MEMS-scanning mirror. The mirror plate 10B is rotated around the X-X' axis shown in FIG. 1A. It is preferable that the entire device layer B be grounded (denoted by reference symbol GND) and the MEMS-scanning mirror device be driven by applying voltages V1 and V2 to the fixed combteeth 12T1 and 12T2. For example, in the case of DC drive, the mirror plate 10B can be rotated by applying a DC voltage to any one of the left and right fixed combteeth 12T1 and 12T2 or by applying different DC voltages to the both fixed combteeth 12T1 and 12T2, respectively. Moreover, in the case of resonant drive, for example, a periodic voltage such as an AC voltage is applied to any one of the left and right fixed combteeth 12T1 and 12T2 or to the both fixed combteeth 12T1 and 12T2.

Second Embodiment

Figure 2A:
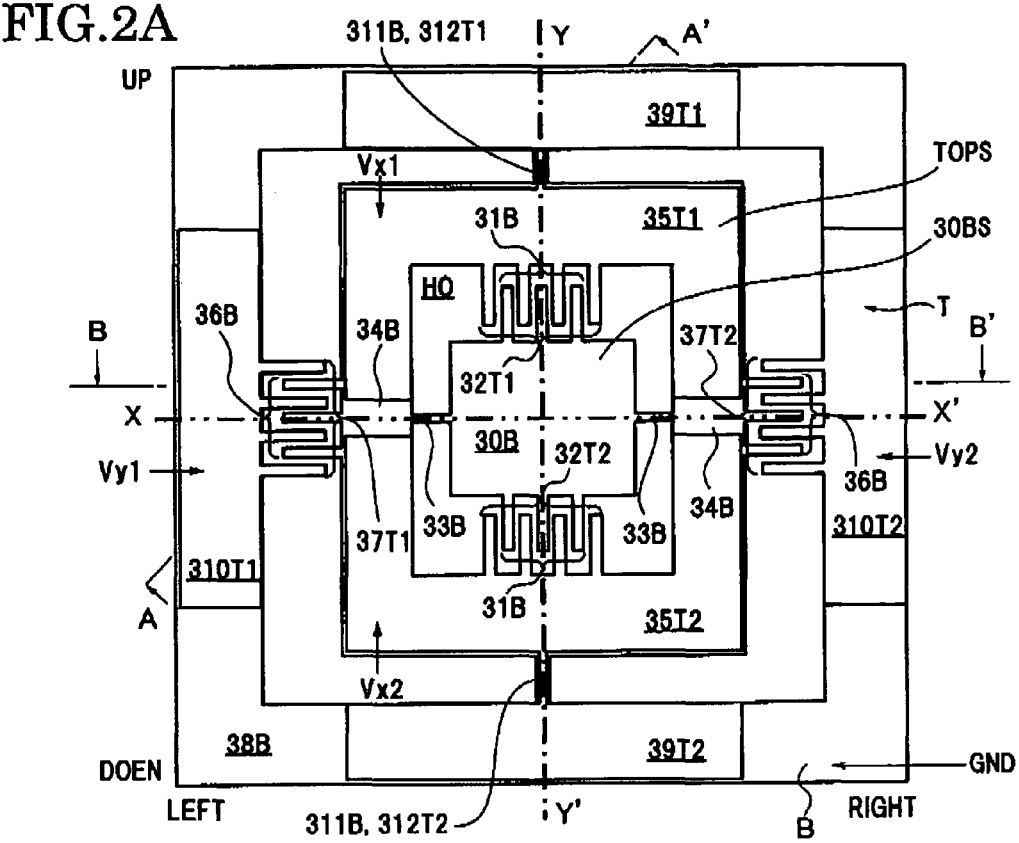
FIG. 2A to 2C are explanatory views showing a second embodiment of an MEMS-scanning mirror according to the present invention.
Figure 2B:
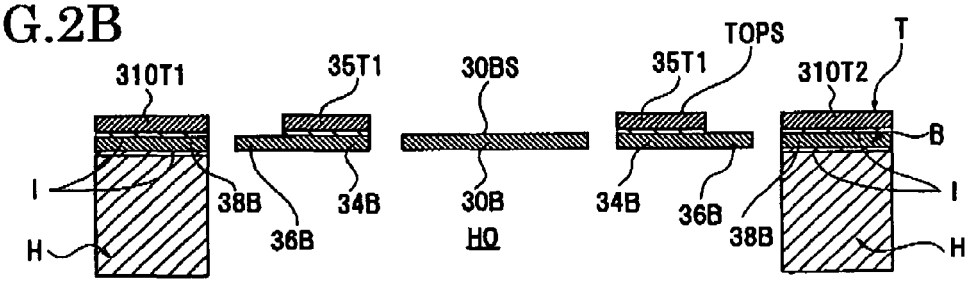
Figure 2C:
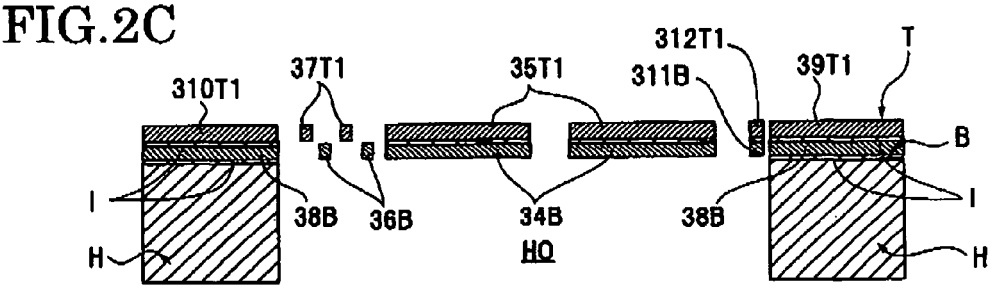

FIGS. 2A to 2C show a second embodiment of an MEMS-scanning mirror having two sets of stepped electrostatic comb actuators according to the present invention. While the mirror plate 10B in the first embodiment is rotated around one axis, a mirror plate in this embodiment can be rotated around two axes, an X-X' axis and a Y-Y' axis shown in FIGS. 2A and 2B.

As shown in FIGS. 2A to 2C, the MEMS-scanning mirror also has a three-layer structure as in the case of the first embodiment, and includes an uppermost device layer T, a lowermost handle layer H and a device layer B therebetween.

The device layer T and the device layer B are made of n type or p type doped conductive silicon. For the handle layer H, insulating or conductive silicon or glass is used. These layers described above are electrically insulated from each other by insulating layers I. The insulating layers I are preferably a silicon oxide when the handle layer H is made of silicon.

In the handle layer H, a hollow HO is formed. Components of the electrostatic comb actuators, which are formed in the device layers T and B, respectively, are located above the hollow HO. The components of the electrostatic comb actuators, which are formed in the device layers T and B, will be described while attaching subscripts to the symbols T and B denoting the respective layers.

The components of the electrostatic comb actuators formed in the device layer B include a mirror plate 30B, movable combteeth 31B around the X axis, springs 33B around the X axis, an internal frame 34B, an external frame 38B, movable combteeth 36B around the Y axis and spring lower portions 311B around the Y axis. All the components are integrated together and electrically equipotential.

In the mirror plate 30B, a pair of the springs 33B around the X axis extended along the X-X' axis are formed. Moreover, in the mirror plate 30B, the movable combteeth 31B around the X axis are formed in a direction perpendicular to the X-X' axis.

These components 30B and 31B are located inside the internal frame 34B. The mirror plate 30B and the internal frame 34B are connected to each other through the springs 33B around the X axis. Thus, the mirror plate 30B is integrated with the internal frame 34B.

In the internal frame 34B, the movable combteeth 36B around the Y axis perpendicular to the Y-Y' axis and a pair of the spring lower portions 311B around the Y axis extended along the Y-Y' axis are formed. The internal frame 34B and the external frame 38B are connected to each other through the spring lower portions 311B around the Y axis. By this structure, all the components formed in the device layer B are integrated together. Note that a film made of gold, aluminum or the like may be formed on a surface of the mirror plate 30B.

The components of the electrostatic comb actuators formed in the device layer T include upper fixed combteeth 32T1 around the X axis, lower fixed combteeth 32T2 around the X axis, an inner upper base 35T1, an inner lower base 35T2, left fixed combteeth 37T1 around the Y axis, right fixed combteeth 37T2 around the Y axis, an outer upper base 39T1, an outer lower base 39T2, an outer left base 310T1, an outer right base 310T2, an upper spring upper portion 312T1 around the Y axis and a lower spring upper portion 312T2 around the Y axis.

The upper fixed combteeth 32T1 around the X axis, the inner upper base 35T1, the upper spring upper portion 312T1 around the Y axis and the outer upper base 39T1 are integrated together. The lower fixed combteeth 32T2 around the X axis, the inner lower base 35T2, the lower spring upper portion 312T2 around the Y axis and the outer lower base 39T2 are integrated together. The left fixed combteeth 37T1 around the Y axis and the outer left base 310T1 are integrated together. The right fixed combteeth 37T2 around the Y axis and the outer right base 310T2 are integrated together. Voltages independent of each other can be set respectively for the integrated components.

For the device layer B, a silicon wafer having a fine mirror surface can be used as in the case of the first embodiment. A material obtained by bonding the device layer B and the handle layer H with the insulating layer I interposed therebetween can be provided for manufacturing of the MEMS-scanning mirror device. Alternatively, an SOI wafer may also be used, in which the device layer B, the insulating layer I and the handle layer H are previously integrated together. A surface of the device layer B in the SOI wafer can be finished in a fine mirror surface state.

In manufacturing of the MEMS-scanning mirror device by using any of the materials described above, the mirror plate 30B having good specularity can be achieved by using the fine mirror surface of the device layer B as it is.

In the MEMS-scanning mirror device of the second embodiment too, as shown in FIGS. 2A and 2B, a surface SOBS of the mirror plate 30B is located below a top surface TOPS formed in the device layer T.

In a case of the conventional MEMS-scanning mirror having the electrostatic comb actuators, a mirror surface is formed on a top surface and, after formation of a mirror plate, subsequent processing is performed while exposing the mirror surface of the mirror plate to the outside. On the other hand, in a case of the MEMS-scanning mirror device according to this embodiment, the surface 30BS of the device layer B can be protected by the insulating layer I such as a silicon oxide film until immediately before completion of the device, as in the case of the first embodiment. Thus, in steps of mask formation, etching, mask removal, film formation and the like to be described later, the surface 30BS of the mirror plate 30B can be prevented from being scratched during handling or the like and from being contaminated.

The movable combteeth 31B around the X axis are inserted between the upper fixed combteeth 32T1 around the X axis and between the lower fixed combteeth 32T2 around the X axis. When a voltage is applied between the movable combteeth 31B and the upper and lower fixed combteeth 32T1 and 32T2, a torque around the X-X' axis is generated in the movable combteeth 31B around the X axis, that is to say, the mirror plate 30B so as to lower electrostatic energy.

Moreover, the movable combteeth 36B around the Y axis are inserted between the left fixed combteeth 37T1 around the Y axis and between the right fixed combteeth 37T2 around the Y axis. When a voltage is applied between the movable combteeth 36B and the left and right fixed combteeth 37T1 and 37T2, a torque around the Y-Y' axis is generated in the movable combteeth 36B around the Y axis, that is to say, the internal frame 34B having the mirror plate 30B so as to lower electrostatic energy.

The MEMS-scanning mirror according to the second embodiment can be driven around the two axes, the X-X' axis and the Y-Y' axis. It is preferable that the entire device layer B be grounded and the MEMS-scanning mirror device be driven by applying voltages Vx1, Vx2, Vy1 and Vy2 to the upper and lower fixed combteeth 32T1 and 32T2 around the X axis and the left and right fixed combteeth 37T1 and 37T2 around the Y axis, respectively.

According to the second embodiment, any of the following drive systems can be adopted, including DC drive for the both two axes, DC drive for one axis and resonant drive for the other axis, and resonant drive for the both two axes. For example, when Vx1, Vx2, Vy1 and Vy2 are all DC voltages, DC drive is adopted for the both two axes. Alternatively, when all the voltages are AC voltages, resonant drive is adopted for the both two axes. Still alternatively, for example, when Vx1 and Vx2 are DC voltages and Vy1 and Vy2 are AC voltages, it is possible to achieve DC drive around the X-X' axis and resonant drive around the Y-Y' axis.

Third Embodiment

Figure 3A:
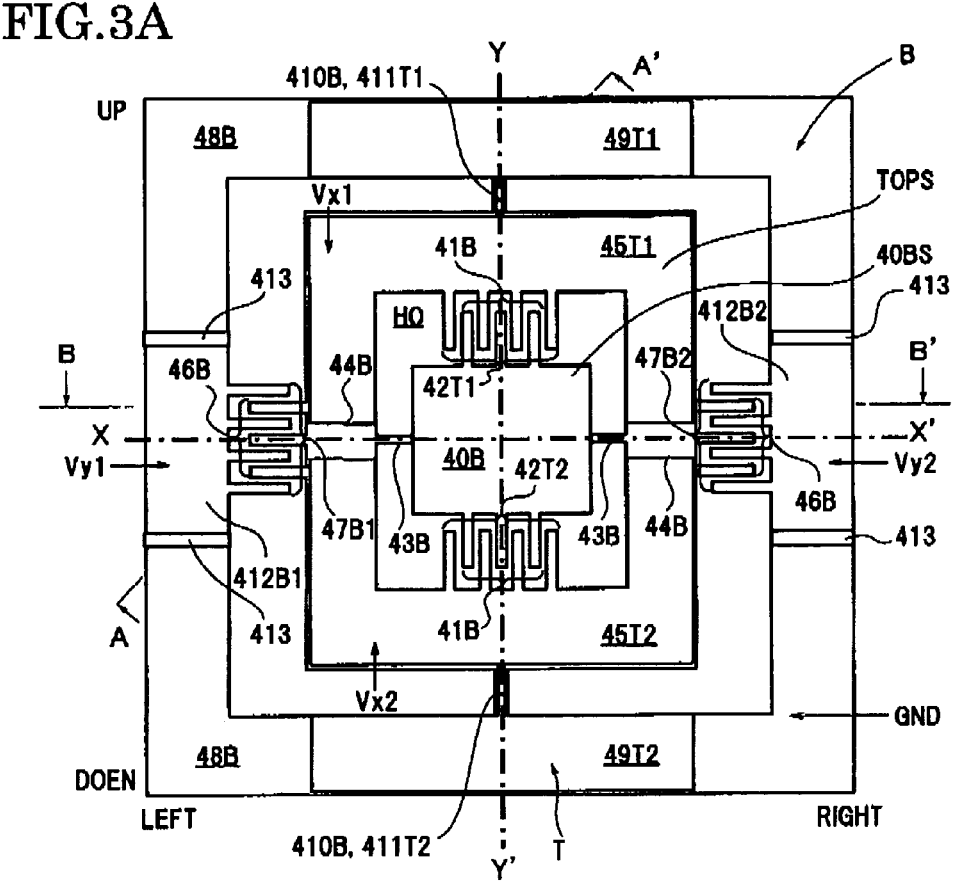
FIG. 3A to 3C are explanatory views showing a third embodiment of an MEMS-scanning mirror according to the present invention.
Figure 3B:
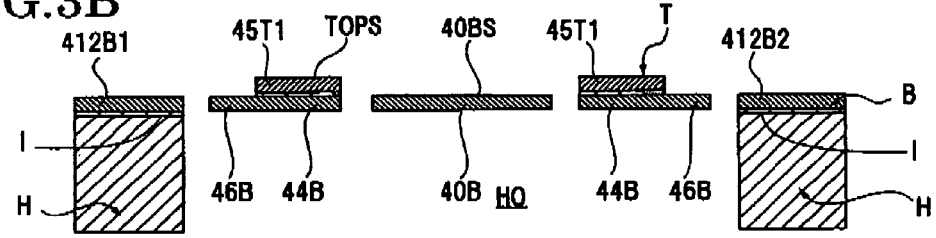
Figure 3C:
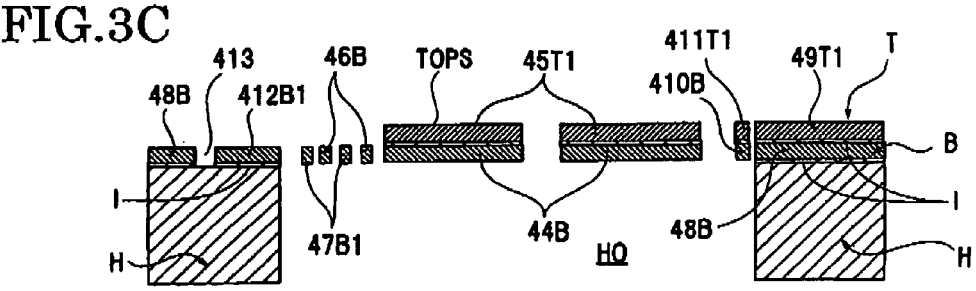

FIGS. 3A to 3C show schematic views of a third embodiment of an MEMS-scanning mirror having one set of stepped electrostatic comb actuators according to the present invention. In the third embodiment, as in the case of the second embodiment, a mirror plate can be rotated around two axes, an X-X' axis and a Y-Y' axis, but drive around the Y-Y' axis is limited to resonant drive.

The MEMS-scanning mirror also has a three-layer structure as in the cases of the first and second embodiments, and includes an uppermost device layer T, a lowermost handle layer H and a device layer B therebetween. The device layer T and the device layer B are made of n type or p type doped conductive silicon. For the handle layer H, insulating or conductive silicon or glass is used. These layers described above are electrically insulated from each other by insulating layers I. The insulating layers I are preferably a silicon oxide when the handle layer H is made of silicon.

In the handle layer H, a hollow HO is formed. Components of the electrostatic comb actuators, which are formed in the device layers T and B, respectively, are located above the hollow HO. The components of the electrostatic comb actuators, which are formed in the device layers T and B, will be described while attaching subscripts to the symbols T and B denoting the respective layers.

The components of the electrostatic comb actuators formed in the device layer B include a mirror plate 40B, movable combteeth 41B around the X axis, springs 43B around the X axis, an internal frame 44B, movable combteeth 46B around the Y axis, left fixed combteeth 47B1 around the Y axis, right fixed combteeth 47B2 around the Y axis, an external frame 48B, spring lower portions 410B around the Y axis, an outer left base 412B1, an outer right base 412B2 and grooves 413.

In the mirror plate 40B, a pair of the springs 43B around the X axis extended along the X-X' axis are formed. Moreover, in the mirror plate 40B, the movable combteeth 41B around the X axis are formed in a direction perpendicular to the X-X' axis. These components 40B and 41B are located inside the internal frame 44B. The mirror plate 40B and the internal frame 44B are connected to each other through the springs 43B around the X axis. Thus, the mirror plate 40B is integrated with the internal frame 44B. In the internal frame 44B, the movable combteeth 46B around the Y axis perpendicular to the Y-Y' axis and a pair of the spring lower portions 410B around the Y axis extended along the Y-Y' axis are formed. In the external frame 48B, the grooves 413 are formed.

Thus, the outer left base 412B1 and the outer right base 412B2 are formed, which are insulated from the external frame 48B. In the outer left and right bases 412B1 and 412B2, the left fixed combteeth 47B1 around the Y axis and the right fixed combteeth 47B2 around the Y axis are formed, respectively.

The components 40B, 41B, 43B, 44B, 46B, 48B and 410B formed in the device layer B are integrated together and electrically equipotential.

The left and right fixed combteeth 47B1 and 47B2 around the Y axis are connected respectively to the outer left and right bases 412B1 and 412B2 electrically isolated from the external frame 48B by the grooves 413. Thus, voltages can be independently applied to the external frame 48B and the outer left and right bases 412B1 and 412B2, respectively. Note that a film made of gold, aluminum or the like may be formed on a surface of the mirror plate 40B.

The components of the electrostatic comb actuators formed in the device layer T include upper fixed combteeth 42T1 around the X axis, lower fixed combteeth 42T2 around the X axis, an inner upper base 45T1, an inner lower base 45T2, an outer upper base 49T1, an outer lower base 49T2, an upper spring upper portion 411T1 around the Y axis and a lower spring upper portion 411T2 around the Y axis.

The upper fixed combteeth 42T1 around the X axis, the inner upper base 45T1, the upper spring upper portion 411T1 around the Y axis and the outer upper base 49T1 are integrated together. The lower fixed combteeth 42T2 around the X axis, the inner lower base 45T2, the lower spring upper portion 411T2 around the Y axis and the outer lower base 49T2 are integrated together. Voltages independent of each other can be set respectively for the integrated components.

For the device layer B, a silicon wafer having a fine mirror surface can be used as in the case of the second embodiment. A material obtained by bonding the device layer B and the handle layer H with the insulating layer I interposed therebetween can be provided for manufacturing of the MEMS-scanning mirror device. Alternatively, an SOI wafer may also be used, in which the device layer B, the insulating layer I and the handle layer H are previously integrated together. A surface of the device layer B in the SOI wafer can be finished in a fine mirror surface state.

In manufacturing of the MEMS-scanning mirror device by using any of the materials described above, the mirror plate 40B having good specularity can be achieved by using the fine mirror surface of the device layer B as it is.

In the MEMS-scanning mirror device of the third embodiment too, as shown in FIGS. 3A and 3B, a surface 40BS of the mirror plate 40B is located below a top surface TOPS defined by the device layer T. In a case of the conventional MEMS-scanning mirror having the electrostatic comb actuators, a mirror surface is formed on a top surface and, after formation of a mirror plate, subsequent processing is performed while exposing the mirror surface of the mirror plate to the outside. On the other hand, in a case of the MEMS-scanning mirror device according to this embodiment, the surface 40BS of the device layer B can be protected by the insulating layer I such as a silicon oxide film until immediately before completion of the device, as in the case of the first embodiment. Thus, in steps of mask formation, etching, mask removal, film formation and the like to be described later, the surface 40BS of the mirror plate 40B can be prevented from being scratched during handling or the like and from being contaminated.

The movable combteeth 41B around the X axis are inserted between the upper fixed combteeth 42T1 around the X axis and between the lower fixed combteeth 42T2 around the X axis. When a voltage is applied between the movable combteeth 41B and the upper and lower fixed combteeth 42T1 and 42T2, a torque around the X-X' axis is generated in the movable combteeth 41B around the X axis, that is to say, the mirror plate 40B so as to lower electrostatic energy. Moreover, the left and right fixed combteeth 47B1 and 47B2 around the Y axis are located so as to form interdigital patterns with the movable combteeth 46B around the Y axis. When an AC voltage is applied between the movable combteeth 46B and the left and right fixed combteeth 47B1 and 47B2, oscillation around the Y-Y' axis is excited in the internal frame 44B having the mirror plate 40B.

The MEMS-scanning mirror according to the third embodiment can be driven around the two axes, the X-X' axis and the Y-Y' axis. It is preferable that the entire device layer B be grounded and the MEMS-scanning mirror (device) be driven by applying voltages Vx1, Vx2, Vy1 and Vy2 to the upper and lower fixed combteeth 42T1 and 42T2 around the X axis and the left and right fixed combteeth 47B1 and 47B2 around the Y axis, respectively. Here, while the fixed combteeth 42T1 and 42T2 and movable combteeth 41B around the X axis form a pair of stepped electrostatic toothed combs, the fixed combteeth 47B1 and 47B2 and movable combteeth 46B around the Y axis form a pair of non-stepped electrostatic toothed combs. Accordingly, only resonant drive can be adopted around the Y axis.

In the third embodiment, it is possible to adopt any of the following drive systems including a DC drive around the X-X' axis, resonant drive around the Y-Y' axis, resonant drive for the both two axes, or the like. For example, when Vx1 and Vx2 are DC voltages and Vy1 and Vy2 are AC voltages, obtained are DC drive around the X-X' axis and resonant drive around the Y-Y' axis. Alternatively, when all the voltages are AC voltages, resonant drive is adopted for the both two axes.

Fourth Embodiment

With reference to FIGS. 4A to 4E, description will be given of an example of a method for manufacturing an MEMS-scanning mirror having one set of stepped electrostatic comb actuators according to the first embodiment. Each of schematic views shown in FIGS. 4A to 4E corresponds to the cross-section taken along the line A-A' in FIG. 1.

Note that the method for manufacturing the MEMS-scanning mirror can be applied to methods for manufacturing the MEMS-scanning mirrors according to the second and third embodiments.

1. Preparation Step

Figure 4A:
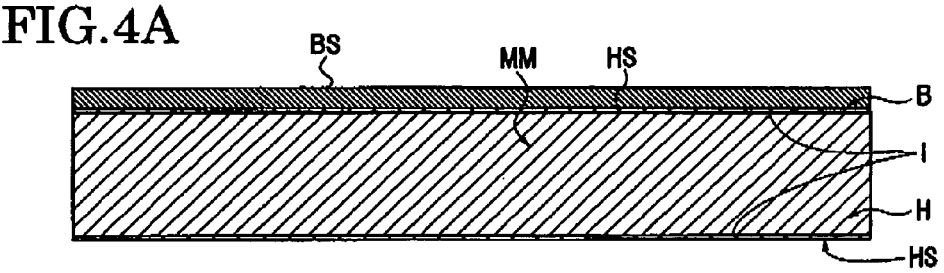
FIGS. 4A to 4E are explanatory views showing an embodiment of a method for manufacturing an MEMS-scanning mirror according to the present invention.

FIG. 4A is a cross-sectional view taken along the line A-A' in FIG. 1, showing a wafer MM before formation of structures corresponding to components of the MEMS-scanning mirror.

In the wafer MM, the device layer B and the handle layer H are integrally formed with the insulating layer I interposed therebetween. A surface BS of the device layer B is previously mirror-finished before processing. The device layer B and the handle layer H are preferably made of silicon and the insulating layer I is a silicon oxide film. Here, a silicon oxide film (insulating layer I) is also formed on a surface HS of the handle layer H.

As the wafer MM, a commercially available silicon-on-insulator (SOI) wafer can be used. In the silicon oxide film (insulating layer I), a first alignment mark (not shown) to be utilized in subsequent processing is formed. This first alignment mark can be formed by: previously forming an alignment pattern on the silicon oxide film (insulating layer I) by use of a photosensitive resist; and then removing the silicon oxide film in a portion not covered with the photosensitive resist, by etching with hydrogen fluoride or buffered hydrogen fluoride. The photosensitive resist can be removed by cleaning with acetone, for example, after the etching.

Figure 4B:
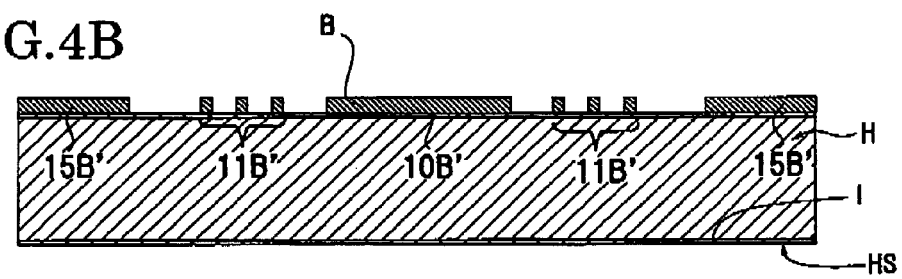

2. Step of Forming Lower Layer Structure Corresponding to Lower Layer Components of MEMS-Scanning Mirror in Device Layer B In the device layer B, structures 10B', 11B', 13B', 14B' and 15B' corresponding respectively to the mirror plate 10B, the movable combteeth 11B, the shafts 13B, the springs 14B and the frame 15B are formed. FIG. 4B shows the structures 10B', 11B' and 15B'.

The processing described above can be performed by deep reactive ion etching (DRIE) using the Bosch process after patterns corresponding to the structures are previously formed with a photosensitive resist on a surface of the device layer B by using the first alignment mark. Note that FIG. 4B shows a state where the photosensitive resist is removed after the DRIE.

3. Step of Bonding Silicon Wafer to Device Layer B

Figure 4C:
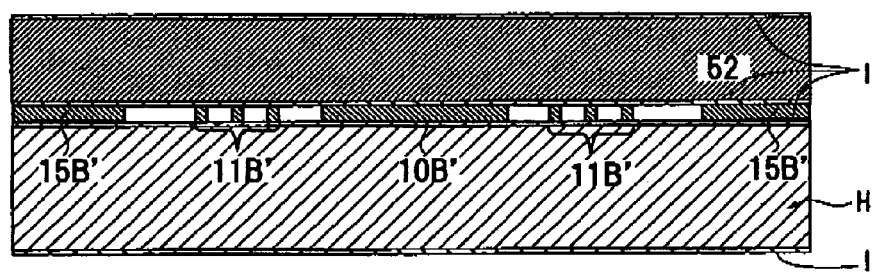

As shown in FIG. 4C, a silicon wafer 52 having silicon oxide films (insulating layers I) formed on its surfaces is bonded to the device layer B. This bonding is performed by bringing a top surface of the device layer B and a surface of the silicon wafer 62 into contact with each other and then heating the both to 1000° C. to 1100° C., for example.

4. Step of Grinding and Lapping Silicon Wafer

Figure 4D:
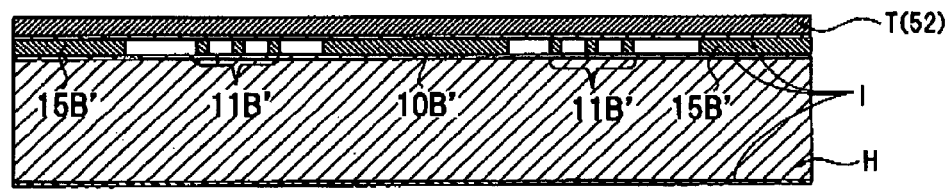

A thickness of the silicon wafer 52 shown in FIG. 4C is reduced by grinding and lapping the silicon wafer 62. Accordingly, as shown in FIG. 4D, the upper device layer T having a predetermined thickness is formed.

In a case of the conventional MEMS-scanning mirror, a surface obtained by subjecting the top surface of the attached wafer to grinding, lapping and polishing serves as a mirror.

Since a surface condition after polishing determines specular performance (mirror performance), surface accuracy tolerated in the conventional processing is stringent. Moreover, when a hollow is formed below the silicon wafer attached to the bottom of the silicon wafer subjected to the conventional processing, particularly, below a portion corresponding to the mirror plate, uniformity of the processing in the wafer surface is impaired, which makes it difficult to obtain a mirror plate having excellent specularity with good yield.

On the other hand, according to the embodiments of the present invention, the mirror is formed not on the top surface of the device but on the previously mirror-finished surface of the wafer. Thus, polishing for mirror finishing can be omitted and required accuracy of surface roughness tolerated in grinding and lapping is reduced compared with the conventional case.

Moreover, as described later, the previously mirror finished surface of the wafer is protected by the silicon oxide film until immediately before completion of the device. Thus, according to the present invention, excellent specularity of the surface of the mirror plate 10B is secured. Therefore, the MEMS-scanning mirror device according to the present invention can improve manufacturing yield.

5. Step of Forming Mask on Handle Layer H

Figure 4E:
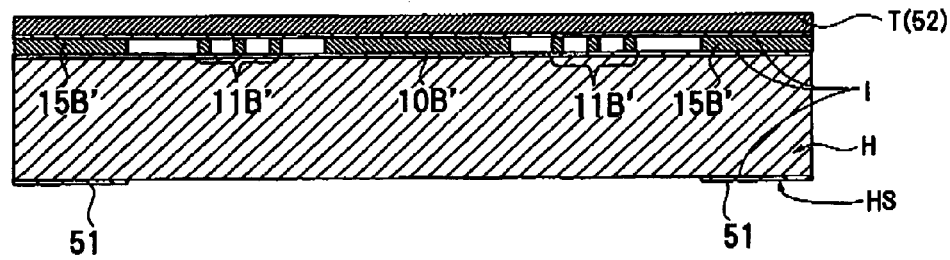

To form a mask 51 to be used in an etching step for forming a hollow in the handle layer H, a part of the silicon oxide film (insulating layer I) on the surface HS of the handle layer H is removed as shown in FIG. 4E. The first alignment mark is used for formation of the mask 51. The mask 51 is obtained by: previously forming a pattern on the silicon oxide film (insulating layer I) by use of a photosensitive resist; and then removing the silicon oxide film in a portion not covered with the photosensitive resist, by etching with hydrogen fluoride or buffered hydrogen fluoride.

Note that the photosensitive resist is removed by cleaning with acetone or the like after the etching. Note that the mask 51 used in the etching is formed so as not to cover a portion below the structures corresponding to at least the mirror plate 10B and the movable combteeth 11B.

Note that, in order to shorten the etching time in the step of forming the mask 51 on the handle layer H, the mask 51 may be previously formed in the preparation step 1. In this way, a thin silicon oxide film (insulating layer I) in a mask opening caused in the step 3 of bonding the silicon wafer to the device layer B can be removed by brief etching.

Figure 5A:
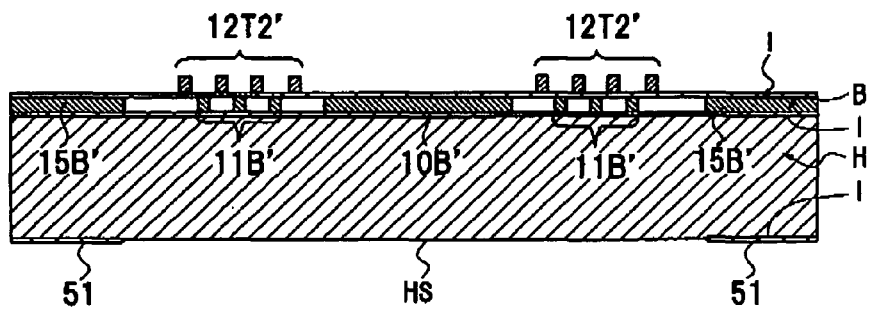
FIGS. 5A to 5D are explanatory views showing the embodiment of the method for manufacturing an MEMS-scanning mirror according to the present invention.

6. Step of Forming Upper Layer Structure Corresponding to Upper Layer Components of MEMS-Scanning Mirror in Device Layer T Next, in the device layer T, structures 12T1', 12T2', 16T1' and 16T2' corresponding respectively to the right fixed combteeth 12T1, the left fixed combteeth 12T2, the right base 16T1 and the left base 16T2 are formed. FIG. 5A shows the structure 12T2'.

In this formation step, although stepped combteeth structures (FIG. 5A shows 12T2' and 11B') are formed, the surface of the mirror plate 10B is not yet exposed but protected by the silicon oxide film (insulating layer I). Moreover, the handle layer H exists below the structure corresponding to the mirror plate 10B and maintains mechanical strength.

For the step of forming the upper layer structure corresponding to the upper layer components of the MEMS-scanning mirror in the device layer T, the same processing method as that used for the step of forming the lower layer structure corresponding to the lower layer components of the MEMS-scanning mirror in the device layer B is used. Note that the first alignment mark can be used also in this processing step.

However, when it is conceivable that the first alignment mark is blurred by going through the processing from Step 2 to Step 5 and sufficient alignment accuracy cannot be obtained, an unillustrated second alignment mark is formed in the device layer B in Step 2 and a through-hole reaching the device layer B is formed in the device layer T, in order for a circumference of the through-hole to surround the second alignment mark by the Bosch process using the first alignment mark, prior to Step 6. Thus, the processing can be accurately performed by use of the second alignment mark.

7. Step of Forming Hollow in Handle Layer H by Etching

Figure 5B:
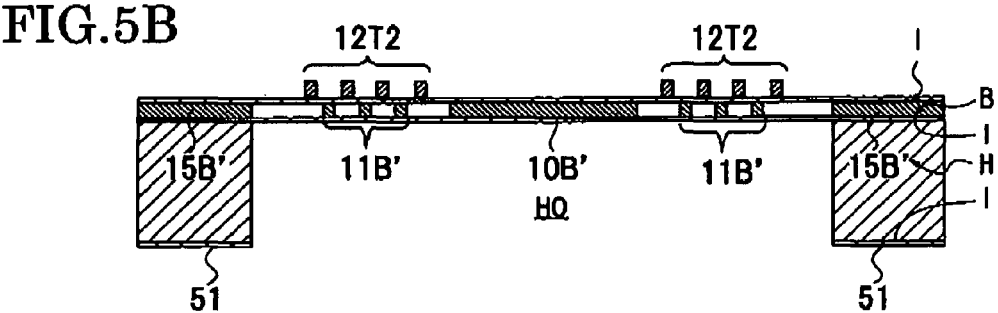

The handle layer H is etched by the Bosch process using the mask 51 formed in Step 5. Thus, as shown in FIG. 5B, the hollow HO is formed below the lower layer structure corresponding to at least the mirror plate 10B and the movable combteeth 11B in the device.

Accordingly, in a rotation operation of the mirror plate 10B and the movable combteeth 11B, collision thereof with the handle layer H is avoided. In this Step 7, each of the movable combteeth 11B and the mirror plate 10B is still fixed by the silicon oxide films (insulating layers I) and is not released.

8. Step of Removing Silicon Oxide Films

Figure 5C:
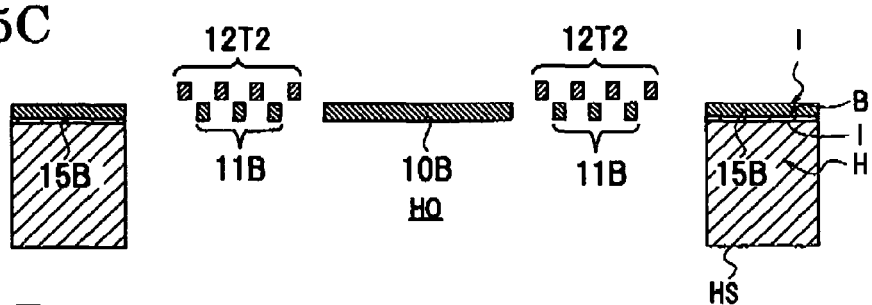

The silicon oxide films (insulating layers I) in exposed portions formed on the surfaces of the handle layer H, having the hollow formed in Step 7, and the device layers T and B are removed by etching as shown in FIG. 5C. As an etchant, hydrogen fluoride can be used. At this stage, the fixing of the movable combteeth 11B and the mirror plate 10B by the silicon oxide films (insulating layers I) is released. Thus, the MEMS-scanning mirror device is completed.

9. Step of Forming Films on Surfaces of Device Layers B and T

Figure 5D:
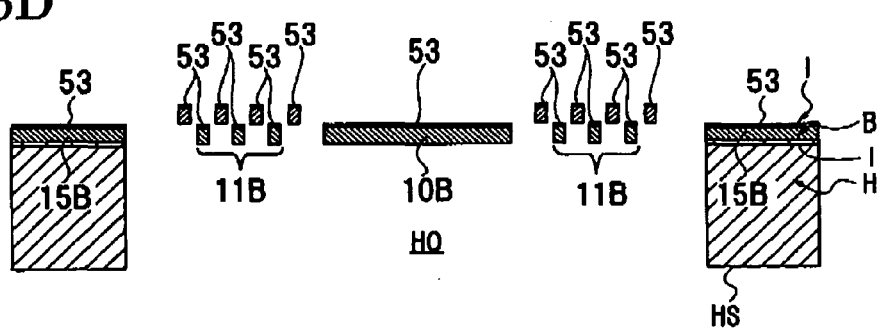
Figure 6:
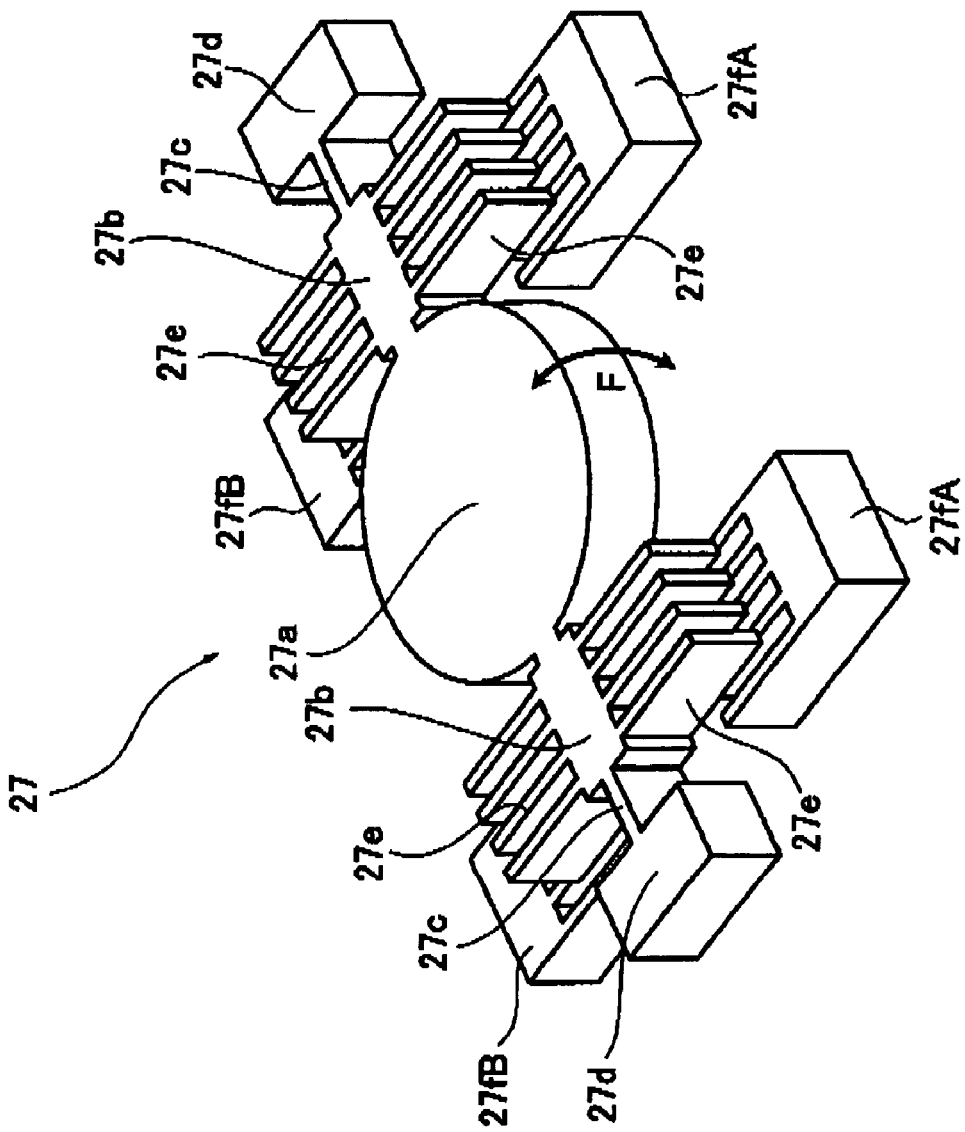
FIG. 6 is a perspective view showing a schematic configuration of a conventional MEMS-scanning mirror having stepped electrostatic comb actuators.

On the surfaces of the device layers B and T, as shown in FIG. 5D, films 53 such as gold, aluminum and dielectric multilayer films are preferably formed by a method such as deposition and sputtering. Thus, mirror reflectivity, that is, mirror characteristic is improved. It is even more preferable to select a material or optically design and employ a multilayer film having suitable reflection and absorption characteristics, in accordance with a wavelength of light to be reflected by the mirror.

According to the method for manufacturing the MEMS-scanning mirror device having at least one set of stepped electrostatic comb actuators according to the present invention, the mirror is formed below the top surface and the surface 10BS of the mirror plate 10B is not exposed until the silicon oxide films (insulating layers I) are removed. Thus, the MEMS-scanning mirror device having excellent specularity can be manufactured with good yield.

Furthermore, the etching using the Bosch process after Step 6 is performed in the state where the entire surface 10BS and back surface of the mirror plate 10B are covered with the silicon oxide films (insulating layers I). Accordingly, the entire surface 10BS and back surface of the mirror plate 10B are protected by the silicon oxide films (insulating layers I) during the etching. Thus, the MEMS-scanning mirror having excellent specularity can be manufactured with good yield.

Moreover, also in the step of forming the structures corresponding to the components of the MEMS-scanning mirror in the device layer T, the handle layer H is present below the mirror plate 10B in the structure having a portion including at least three layers of silicon. Accordingly, mechanical strength of the portion of the mirror plate 10B is improved. Thus, the MEMS-scanning mirror device having excellent specularity can be manufactured with good yield.

According to the MEMS-scanning mirror device using the electrostatic comb actuators and the manufacturing method thereof according to the present invention, the mirror is formed at a position below the top surface of the device and mirror surface formation by grinding, lapping or polishing is not performed after wafer bonding. Thus, good specularity of the mirror is achieved.

Moreover, since no hollow is provided below the mirror plate until immediately before completion of the device. Thus, damage or scratches on the surface of the mirror plate caused during processing can be prevented. Furthermore, the requirement for finishing roughness of the top surface of the device can be reduced. Therefore, the MEMS-scanning mirror having at least one set of stepped electrostatic comb actuators with excellent specularity can be manufactured with good yield.

Although the preferred embodiments of the present invention have been described, it should be understood that the present invention is not limited to those embodiments, but various changes and modifications can be made to those embodiments.

What is claimed is:

1. A method for manufacturing an MEMS-scanning mirror device, comprising the step of forming a mirror surface of a mirror portion below a top surface of an electrostatic comb actuator by covering a surface of the electrostatic comb actuator and a surface of the mirror portion with silicon oxide films; and then by removing the silicon oxide film on the mirror portion to expose the mirror surface.

2. The method for manufacturing an MEMS-scanning mirror device, according to claim 1, the device including an electrostatic comb actuator having a portion including at least three layers of silicon, wherein
  a handle layer is present below the mirror portion when a stepped combteeth structure is formed.

3. The method for manufacturing an MEMS-scanning mirror device, according to claim 2, wherein
  after the combteeth structure is formed in the state where the handle layer is present below the mirror plate, a surface of the mirror plate is exposed by removing the silicon oxide film.

4. A method for manufacturing an MEMS-scanning mirror device, comprising the steps of:
  preparing a wafer in which a handle layer and a device layer having a mirror-finished surface are bonded to each other with a silicon oxide film interposed therebetween, the handle layer being a layer in which a hollow is to be formed;
  forming, in the device layer, a lower layer structure to be formed in the device layer, the structure corresponding to a lower layer component of the MEMS-scanning mirror;
  bonding a wafer for forming an upper device layer to the device layer of the wafer after formation of the lower layer structure, with a silicon oxide film interposed therebetween;
  forming the upper device layer having a predetermined thickness by processing the upper wafer;
  forming, in the upper device layer, an upper layer structure to be formed in the upper device layer, the structure corresponding to an upper layer component of the MEMS-scanning mirror;
  forming the hollow in the handle layer; and
  completing the MEMS-scanning mirror by removing the silicon oxide films on the lower layer structure.

* * * * *

UNITED STATES PATENT AND TRADEMARK OFFICE
CERTIFICATE OF CORRECTION

PATENT NO. : 8,279,509 B2  Page 1 of 1
APPLICATION NO. : 12/588804
DATED : October 2, 2012
INVENTOR(S) : Hirotake Maruyama It is certified that error appears in the above-identified patent and that said Letters Patent is hereby corrected as shown below:

In the Claims:

In column 14, claim 1, line 25 should read --portion to expose the mirror surface; wherein the electrostatic comb actuator excludes comb teeth positioned below the mirror portion.--

*And*

In column 14, claim 4, line 61 should read --silicon oxide films on the lower layer structure;
wherein the MEMS-scanning mirror excludes an actuator component formed below the lower layer component of the MEMS-scanning mirror.--

Signed and Sealed this
Third Day of September, 2013

Teresa Stanek Rea
*Acting Director of the United States Patent and Trademark Office*